April 26, 1949.          P. A. COLE ET AL          2,468,655
DIODE DETECTOR FOR HYPERFREQUENCIES
Filed Aug. 20, 1945
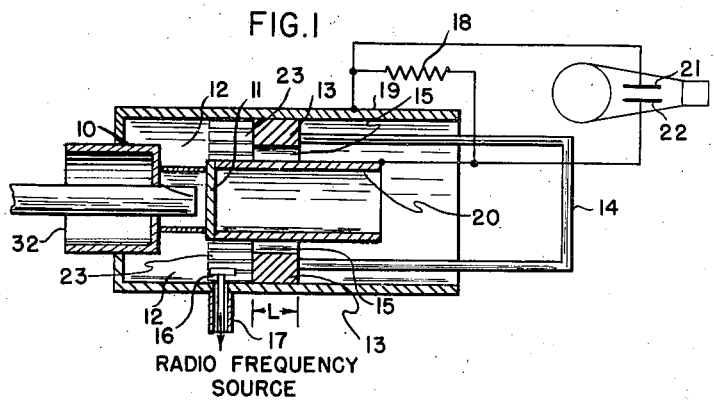
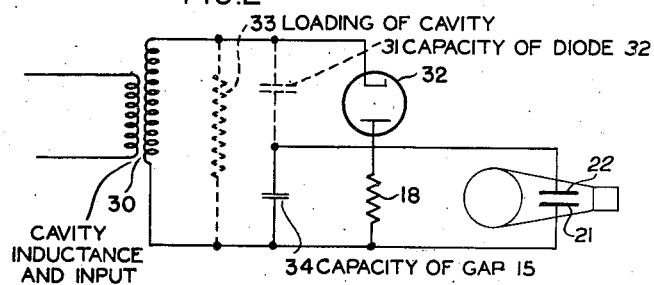
INVENTORS
PETER A. COLE
JAMES B. HORNER KUPER
BY
William D. Hall
ATTORNEY Patented Apr. 26, 1949

2,468,655

UNITED STATES PATENT OFFICE 2,468,655

DIODE DETECTOR FOR HYPER-FREQUENCIES

Peter A. Cole, Belmont, Mass., and James B. Horner Kuper, Redding, Conn., assignors, by mesne assignments, to the United States of America as represented by the Secretary of War Application August 20, 1945, Serial No. 611,656

1 Claim. (Cl. 250—27)

This invention relates in general to electrical detector circuits and more particularly to such circuits as are adapted to operate at hyperfrequencies.

It often becomes necessary in radio pulse communication systems to determine the approximate time of rise or fall of the leading or trailing edges of the output pulse from the transmitter of such a system. One of the most practical ways of determining these approximate times is to detect the radio-frequency pulse, and apply the detected radio-frequency pulse envelope to the deflecting plates of a cathode ray tube. Thus, with the use of a suitable time base, the time of rise or fall of the pulse energy may be observed and measured directly on the screen of the cathode ray tube.

When the carrier radio frequency of the pulse is in the hyperfrequency range, i.e., the range where ordinary resistors, condensers and coils may no longer be used as circuit elements, some such means as cavity resonators must be resorted to for use as resonant elements.

Among the objects of the present invention, therefore, are:

1. To provide a means for detecting the video frequency energy in a hyperfrequency pulse; and
2. To provide a means for adapting such detected energy so that the pulse is suitable for viewing on the screen of a cathode ray tube.

In accordance with the present invention there is provided a detector for hyperfrequency pulse waves in which a cartridge-type (lighthouse) diode vacuum tube is held in a round cavity resonator. The radio frequency energy is coupled into the cavity by means of a probe, and the detected video pulse is taken from across a resistor connected between the anode and the outer shell of the cavity resonator.

This invention will best be understood by reference to the drawings, in which:

Fig. 1 is a simplified diagram of the detector; and

Fig. 2 is a diagram of the approximate equivlent circuit of the device.

Referring now to a description of the invention and to Fig. 1, there is shown a cartridge-type diode 32 with cathode 10 and anode 11 placed substantially symmetrically within the circular cavity resonator 12. This type of tube has circular, flat cathode and anode faces which are very close together. One such tube is the type GL559 manufactured by the General Electric Company. The cavity 12 is tuned by a plunger 13 which is movable by means of handle 14. A cylindrical air space 15 between the plunger 13 and the outer shell 20 of the tube's anode 11 has a length L which is in the neighborhood of a quarter of the operating wavelength of the detector, the plunger 13 making good contact with the walls of the cavity 12 by means of spring fingers 23, so that the plunger 13 presents an effective short circuit at that end of the cavity. The radio frequency energy is coupled into the cavity 12 through a coaxial line 17 by means of probe 16. The detected voltage is developed across load resistor 18, which is connected between the outer shell 19 of the cavity resonator and the end of the anode shell 20. Connected directly across the resistor 18 by means of very short leads are two deflecting plates 21 and 22 of a cathode ray tube.

Fig. 2 is a circuit diagram of the approximate equivalent circuit of the detector. The transformer 30 represents the input circuit, with its secondary being tuned by the capacity 31 of the diode 32. The resistance 33 in parallel with the secondary of transformer 30 represents a combination of the losses in the cavity 12 and the loading due to the diode 32. Connecting the plate of the diode 32 to the cavity, represented by transformer 30, is the load resistance 18. Capacity 34 represents the capacitance of the portion of the circuit across which resistor 18 is connected.

Referring now to the operation of the circuit and to Fig. 2, it may be assumed that the diode capacity 31 is a lumped capacity which tunes the inductance of the cavity to resonance. The reactance of capacitance 34 is assumed negligible at hyperfrequencies. The detected envelope of voltage will appear across load resistor 18, the voltage across which is suitable for application to the plates of an oscilloscope.

In design, the choice of size of the load resistance 18 must be a compromise between a large value for good sensitivity and a small value for good transient characteristics. For some purposes, a load of from 200 to 300 ohms appears to be a satisfactory compromise. With careful design, the detector can be made to have a rise time for a rectangular pulse input in the order of hundredths of a microsecond.

While there has been described what is at present considered the preferred embodiment of the invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A device for analyzing the envelope of modulated radio frequency energy comprising a substantially tubular cavity resonator having stationary and movable end members, a probe means for coupling radio frequency energy into said cavity resonator, a lighthouse-type diode thermionic tube, the axes of said cavity resonator and said diode being substantially colinear, the cathode of said diode being connected to the stationary end member and the anode capacitively coupled to the movable end member, and a load resistance means connected from the anode of said diode to the outer shell of said cavity resonator, whereby the detected voltage is formed across said resistance means, and cathode ray tube having deflecting plates connected across said load resistance means.

PETER A. COLE.
JAMES B. HORNER KUPER.

REFERENCES CITED

The following references are of record in the file of this patent:

UNITED STATES PATENTS

| Number | Name | Date |
| --- | --- | --- |
| 2,032,914 | Crossley et al. | Mar. 3, 1936 |
| 2,314,794 | Linder | Mar. 23, 1943 |
| 2,410,122 | Mercer et al. | Oct. 29, 1946 |
| 2,413,939 | Benware | Jan. 7, 1947 |

OTHER REFERENCES

"Electronics," for February 1946, vol. 19, number 2, pages 135–137.